United States Patent [19]
Fujii et al.

[11] Patent Number: 6,106,960
[45] Date of Patent: *Aug. 22, 2000

[54] JOINED ARTICLES, CORROSION-RESISTANT JOINING MATERIALS AND PROCESS FOR PRODUCING JOINED ARTICLES

[75] Inventors: Tomoyuki Fujii, Nagoya; Ryusuke Ushikoshi, Tajimi, both of Japan

[73] Assignee: NGK Insulators, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/594,655

[22] Filed: Feb. 2, 1996

[30] Foreign Application Priority Data

Feb. 9, 1995 [JP] Japan ................................ 7-021657
Jan. 19, 1996 [JP] Japan ................................ 8-024835

[51] Int. Cl.[7] .......................... C04B 37/02; B23K 35/28; B32B 15/04

[52] U.S. Cl. .......................... 428/627; 428/621; 428/652; 228/124.5

[58] Field of Search .......................... 428/627, 457, 428/469, 621, 652, 680; 228/124.1, 124.5

[56] References Cited

U.S. PATENT DOCUMENTS

| | | | |
|---|---|---|---|
| 3,428,450 | 2/1969 | Ginsberg et al. | 75/170 |
| 4,426,033 | 1/1984 | Mizuhara | 228/124.5 |
| 4,596,354 | 6/1986 | Moorhead | 228/122 |
| 4,606,980 | 8/1986 | Mizuhara | 428/606 |
| 4,611,745 | 9/1986 | Nakahashi et al. | 228/123 |
| 4,854,495 | 8/1989 | Yamamoto et al. | 228/124.1 |
| 4,897,243 | 1/1990 | Mizuhara | 420/488 |
| 4,924,033 | 5/1990 | Iyogi et al. | 174/259 |
| 5,213,877 | 5/1993 | Yoshida et al. | 428/209 |
| 5,354,415 | 10/1994 | Fushii et al. | 156/630 |
| 5,372,298 | 12/1994 | Glaeser et al. | 228/195 |
| 5,525,432 | 6/1996 | Do-Thoi et al. | 228/124.1 |
| 5,600,530 | 2/1997 | Smith | 361/234 |
| 5,629,559 | 5/1997 | Miyahara | 257/666 |
| 5,633,073 | 5/1997 | Cheung et al. | 228/124.1 |
| 5,675,474 | 10/1997 | Nagase et al. | 361/704 |

FOREIGN PATENT DOCUMENTS

| | | |
|---|---|---|
| 0 197 397 A2 | 10/1986 | European Pat. Off. . |
| 0 361 678 | 4/1990 | European Pat. Off. . |
| 0 455 229 A2 | 11/1991 | European Pat. Off. . |
| 0 455 229 A3 | 11/1991 | European Pat. Off. . |
| 2 327 017 0 | 4/1973 | France . |
| 6-99199 | 12/1994 | Japan . |
| 7-247176 | 9/1995 | Japan . |
| WO 93/23246 | 11/1993 | WIPO . |

OTHER PUBLICATIONS

Patent Abstracts of Japan, vol. 017, No. 627 (C–1131), Nov. 19, 1993 & JP 05 194054 A (Murata MFG Co Ltd), Aug. 3, 1993, *abstract*.

S.J. Schneider Jr.: "Ceramics and Glasses" Jun. 1992, ASM International, US XP000371734 p. 502—p. 510.

*Primary Examiner*—John J. Zimmerman
*Attorney, Agent, or Firm*—Parkhurst & Wendel, L.L.P.

[57] ABSTRACT

A joined article is constituted by a first member made of aluminum nitride joined to each other through a joining layer, wherein a second member is made of a material selected from a ceramic material or a metal, and the joining layer involves a continuous phase made of a metal selected from the group consisting of copper, aluminum and nickel as a main component and 10% by weight of at least one active metal selected from the group consisting of magnesium, titanium, zirconium and hafnium relative to the joining layer.

4 Claims, 12 Drawing Sheets

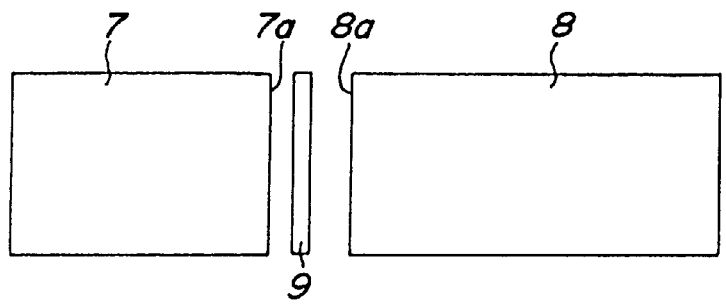
FIG_1a
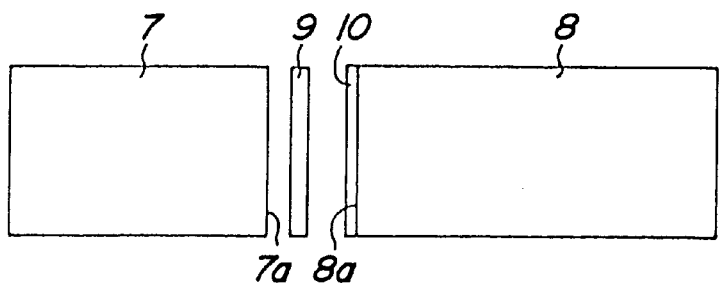
FIG_1b
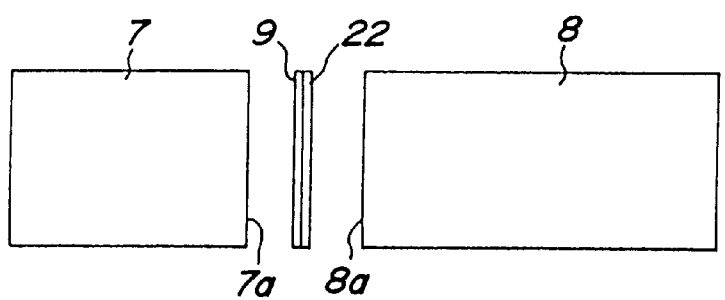
FIG_1c

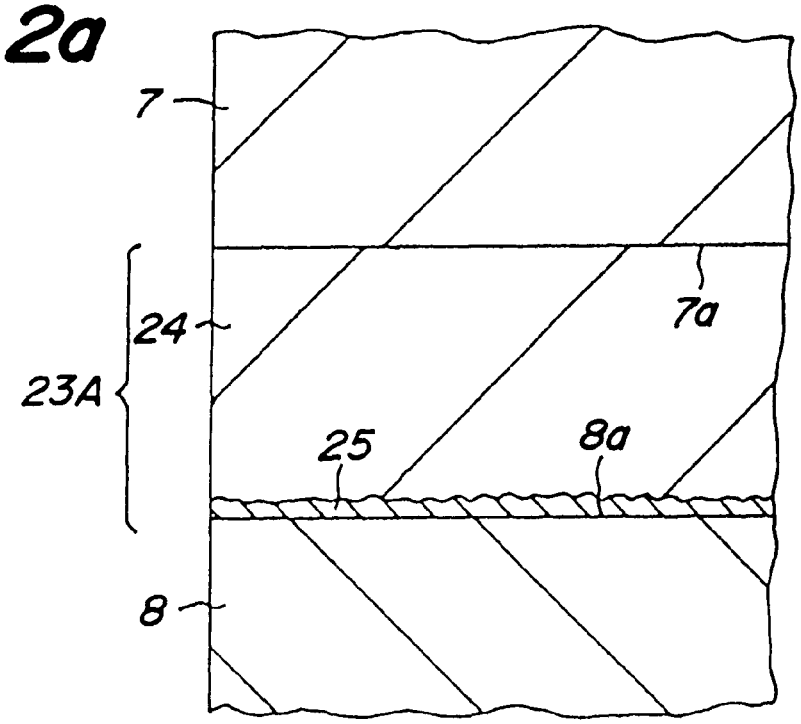
FIG_2a
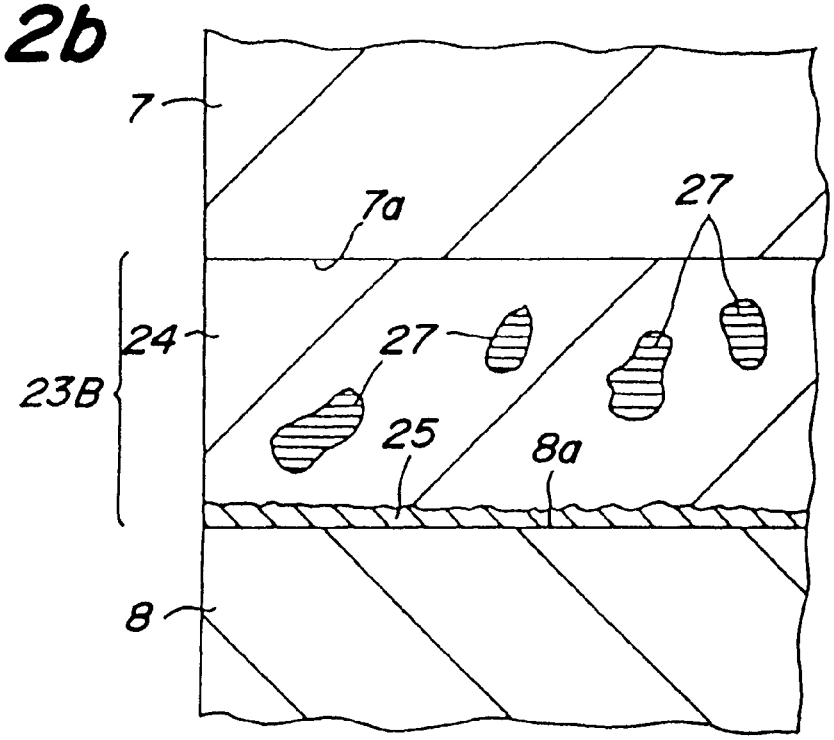
FIG_2b

FIG_3a
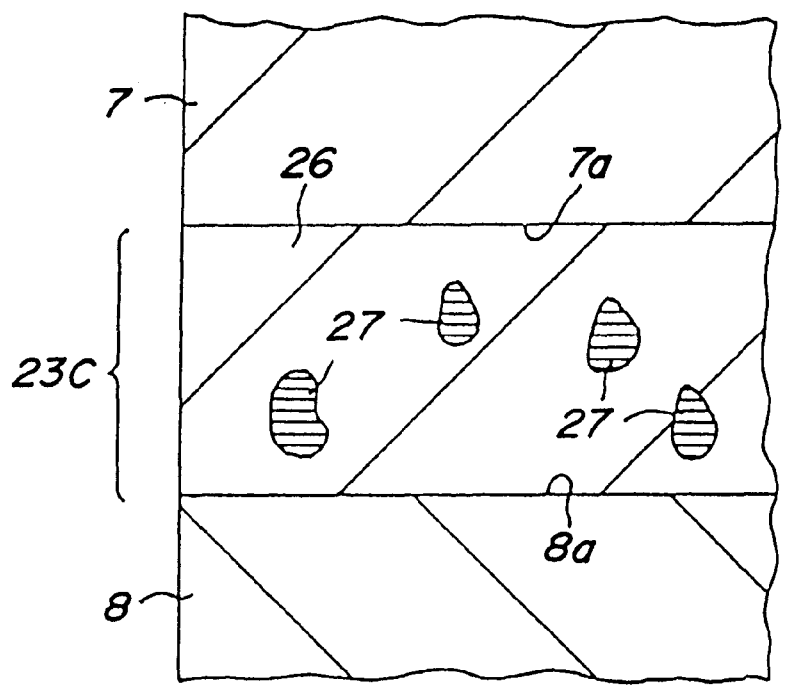
FIG_3b
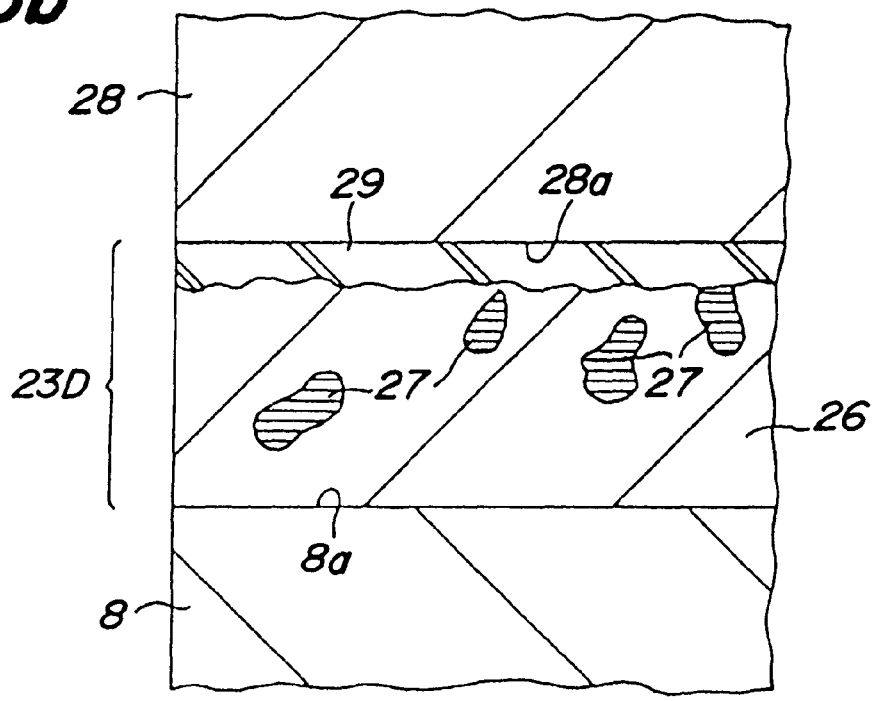

FIG._4a
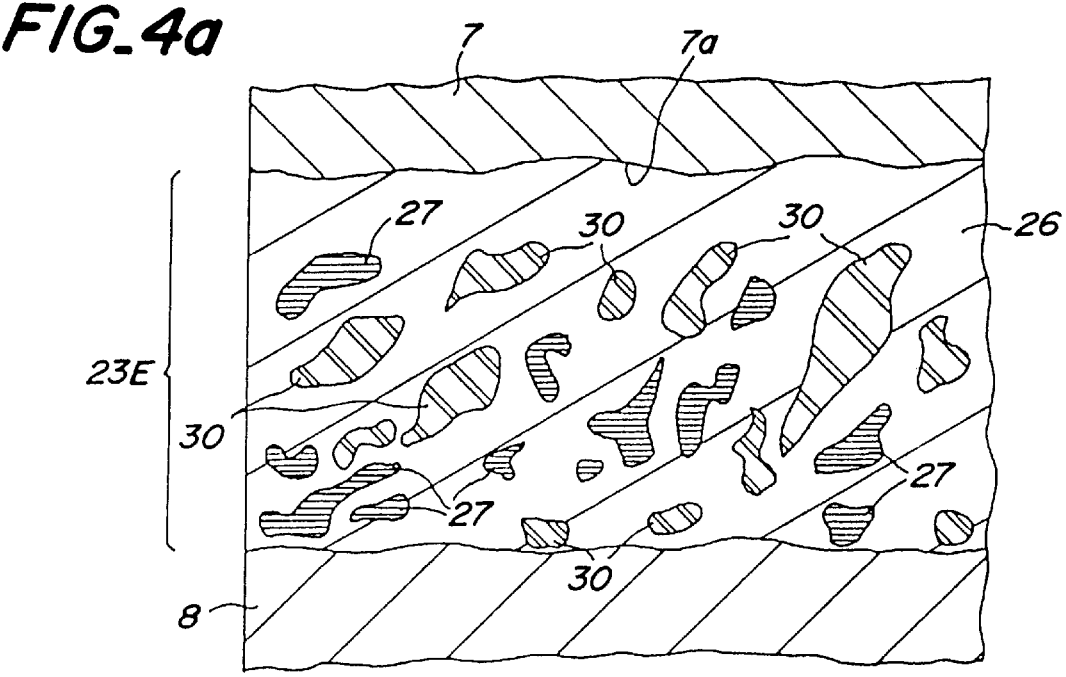
FIG._4b
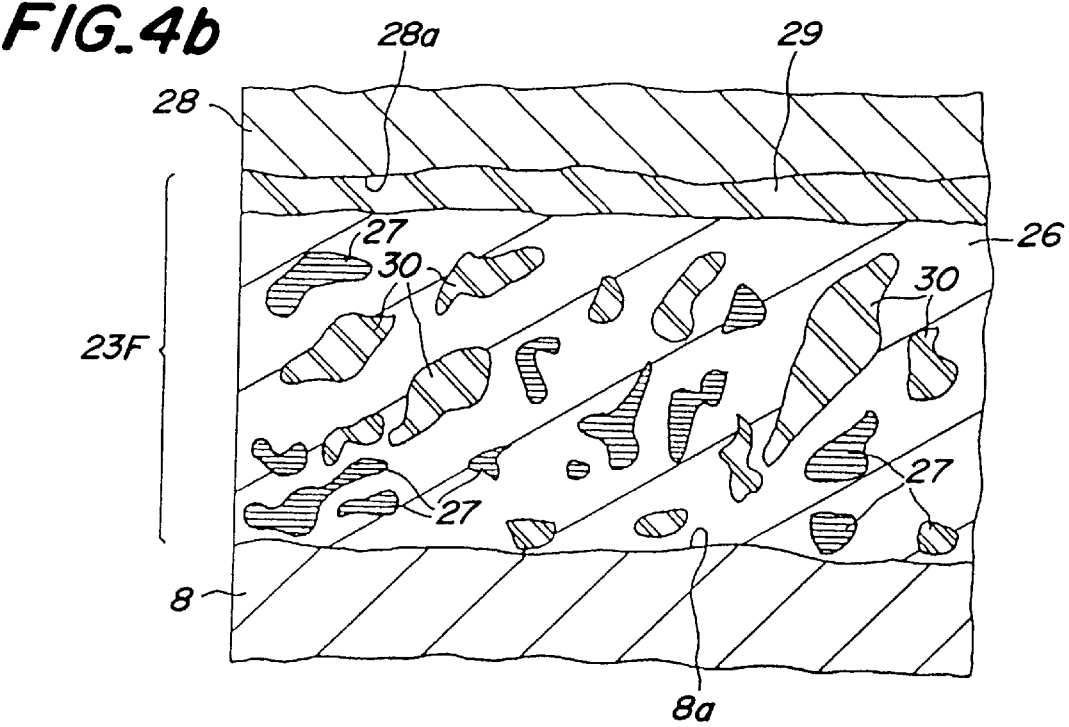

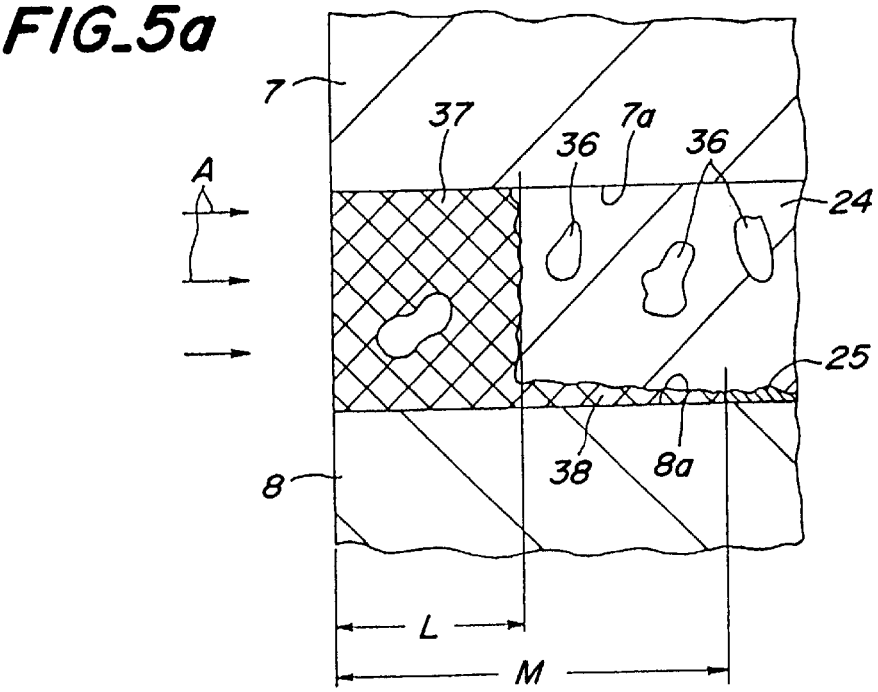
FIG_5a
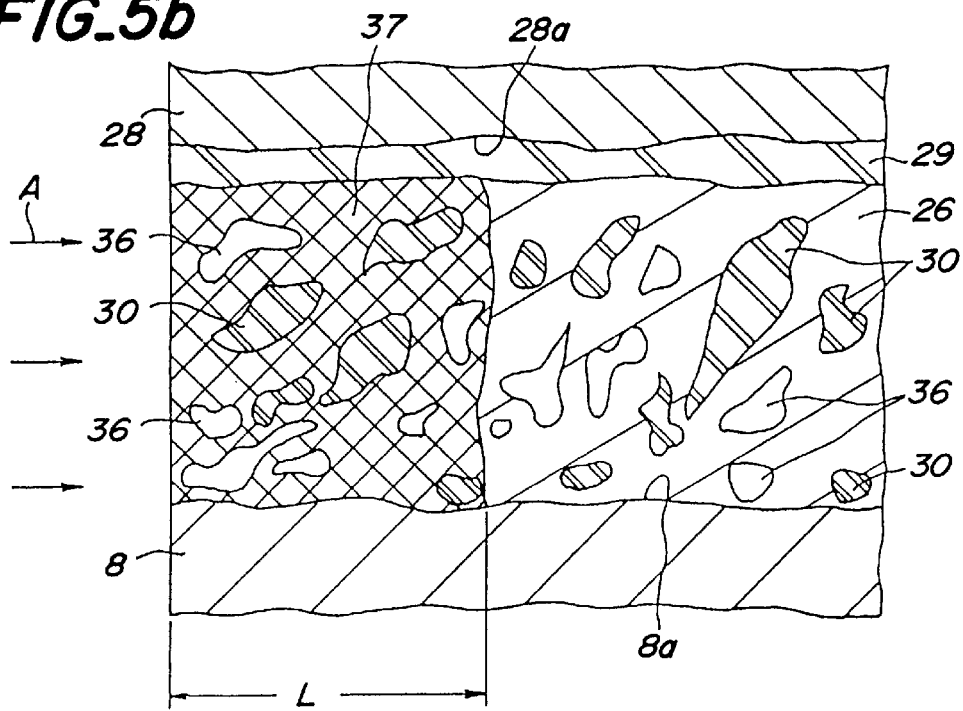
FIG_5b

FIG_7a
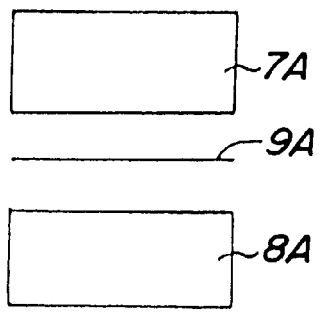
FIG_7b
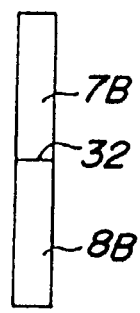
FIG_7c
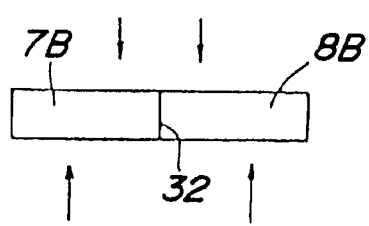
FIG_7d
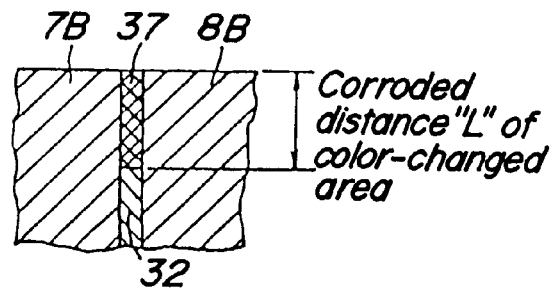

FIG_12
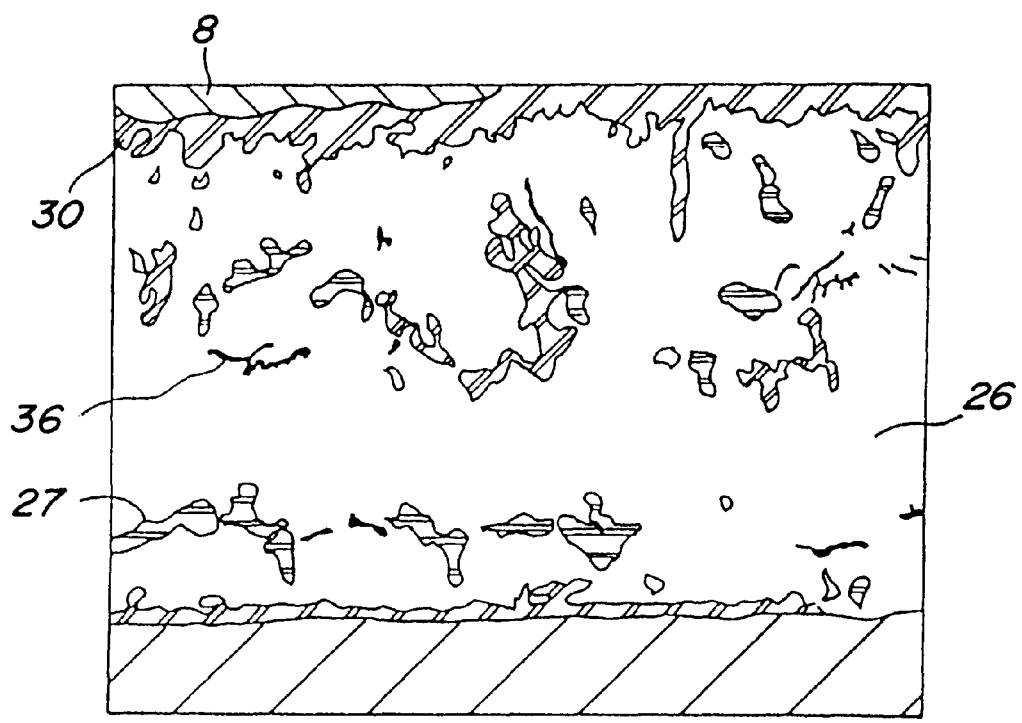

though he the United States Patent 6,106,960

JOINED ARTICLES, CORROSION-RESISTANT JOINING MATERIALS AND PROCESS FOR PRODUCING JOINED ARTICLES

BACKGROUND OF THE INVENTION (1) Field of the Invention

The present invention relates to a joined article made of an aluminum nitride member and a ceramic member, a joined article made of such an aluminum nitride member and a metallic member, a producing process thereof, and a corrosion-resistive joining material.

(2) Related Art Statement

Heretofore, joined articles made of aluminum nitride members and ceramic members as well as joined articles made of aluminum nitride members and metallic members have been constructed in various manners, and used in various applications. For example, in case of ceramic heaters, electrostatic chucks, high frequency electrodes, etc. used in semiconductor-producing apparatuses, aluminum nitride members vs. various ceramic members, aluminum nitride members vs. metallic fittings for thermocouple sets, aluminum nitride members vs. electrodes, etc. need to be joined to each other.

Having noted a brazing process among various joining processes, the present inventors tried to join an aluminum nitride member to a ceramic member or such an aluminum member to a metallic member through a brazing material arranged therebetween by heating such a brazing material. However, the inventors discovered that while most of the brazing materials were satisfactorily joined to the metals it is difficult to wet the aluminum nitride member, so that the brazing material was not satisfactorily joined to the aluminum nitride member or a very small gap was formed therebetween to reduce joining strength. Further, when such a joined article is arranged in the semiconductor-producing apparatus, the joined article including the aluminum nitride member is required to be arranged in and exposed to an atmosphere of a halogen-based corrosive gas, particularly containing plasma. However, the inventors discovered that in such a use, the corrosive atmosphere entered the joined interface through the brazed portion so that the joined layer was deteriorated to consequently reduce the joining strength of the aluminum nitride joined article.

SUMMARY OF THE INVENTION

The present invention is directed to a joined article made of a aluminum nitride member and a metallic member or a ceramic member joined through a brazing material, and is aimed at improving wettability of the aluminum nitride, consequently enhancing joining strength, and improving corrosion-resistance of the joined article against the halogen-based corrosive gas.

The present invention relates to the joined article comprising a first member made of aluminum nitride, a second member made of a material selected from a ceramic material or a metal, said members being joined to each other through a joining layer, wherein said joining layer comprises a continuous phase made of a metal selected from the group consisting of copper, aluminum and nickel as a main component and 10% by weight of at least one active metal selected from the group consisting of magnesium, titanium, zirconium and hafnium relative to the joining layer.

The present invention also relates to a process for producing a joined article of a first member made of aluminum nitride and a second member made of a material selected from a ceramic material or a metal, said process comprising the steps of: (1) separately preparing said first and second members; (2) arranging a brazing material between said first and second members, said brazing material comprising a metal selected from the group consisting of copper, aluminum and nickel as a main component and 0.3% by weight to 10% by weight of at least one active metal selected from the group consisting of magnesium, titanium, zirconium and hafnium relative to the joining layer; and (3) brazing said first member to said second member by heating said brazing material.

The present invention also relates to a corrosion-resistive joining material adapted to join a plurality of members and to be exposed to a halogen-based corrosive gas, each of said members being made of a ceramic material or a metal, wherein said corrosion-resistive joining material contains a nickel-aluminum intermetallic compound.

The present inventors tried to find a brazing material for firmly joining aluminum nitride members to opponent members, and discovered that when a brazing material comprising a metal selected from the group consisting of copper, aluminum and nickel as a main component and 0.3% by weight to 10% by weight of at least one active metal selected from the group consisting of magnesium, titanium, zirconium and hafnium relative to the joining layer is used, a joined portion between the aluminum nitride member and the opponent member exhibits improved corrosion resistance against the halogen-based corrosive gas and wettability of the aluminum nitride member with the brazing material is improved. The inventors reached the present invention based on this discovery.

If a metal other than the above ones as the main component of the brazing material was used, the corrosion resistance against the halogen-based corrosive gas, particularly such a halogen-based corrosive gas containing plasma, was poor, the corrosion of the joining interface proceeded, and joining strength largely decreased.

However, if the brazing material was made of the above main component alone, it exhibited poor wettability upon the aluminum nitride member. However, when at least one kind of magnesium, titanium, zirconium and hafnium was incorporated into the brazing material, the wettability upon the aluminum nitride member with the brazing material was conspicuously enhanced.

Further, it was also confirmed that if the content of at least one kind of these active metals is not less than 0.3% by weight in the brazing material, the wettability upon the aluminum nitride member with the brazing material is conspicuously improved. When the content of at least one kind of the active metals was not less than 1.0% by weight in the brazing material, the above wettability was more enhanced. On the other hand, when the content of at least one kind of these active metals was not more than 10% by weight, corrosion resistance of the brazing material against the halogen-based corrosive gas was largely improved. From the above point of view, it is more preferable that the content of at least one kind of the active metals is set at not more than 5.0% by weight. However, in the case of magnesium, since a part of magnesium is evaporated off during joining, the content of magnesium may be less than 0.3% by weight, ordinarily for example 0.1% by weight, even if not less than 0.3wt % of magnesium is contained.

The main component of the brazing material is aluminum, nickel or copper. The above content means a value obtained by subtracting a total percentage of at least one kind of the active metals and from 100% by weight corresponding to the entire brazing material.

The brazing material containing aluminum as its main component is preferably used, because this brazing material permits joining at a lower temperature and smaller thermal stress after the joining, as compared with those containing nickel or copper.

A third component may be incorporated in the brazing material. When the main component is aluminum, silicon or boron is preferably used as the third component because such elements give no adverse effect upon the main component. When the main component is nickel or copper, at least one element selected from the group consisting of silicon, boron and aluminum is preferably used as the third component because such elements give no adverse effect upon the main component.

The above third component functions to lower the melting point. The addition of the third component makes the fluidability of the brazing material greater even at the same temperature. If the content of the third component is over 20% by weight, the corrosion resistance of the joining layer becomes smaller. Therefore, the content of the third component is preferably not more than 20% by weight, and more preferably 1 to 12% by weight.

As the ceramic material constituting the second member to be joined to the first member made of aluminum nitride, a ceramic material having corrosion resistance against the halogen-based corrosive gas is preferable, and particularly aluminum nitride or dense alumina is more preferable. Further, as the metal constituting said second member, a metal having corrosion resistance against the halogen-based corrosive gas is preferable, and particularly a metal selected from the group consisting of nickel, copper, aluminum and an alloy made of any two or three of these metals is more preferable.

As to the aluminum alloy-based brazing material, 1 to 2% by weight of magnesium and 9–12% by weight of silicon are preferably contained so as to improve wettability. Furthermore, it is preferable that a film made of at least one metal selected from copper, aluminum and nickel is formed, before the joining, on at least one of a surface of said first member made of aluminum nitride which is to be joined to said second member and a surface of said brazing material which is to be joined to the aluminum nitride member by sputtering, vapor deposition, friction press contacting, plating or the like. This film enhances the wettability to the brazing material. The thickness of this film is preferably is 0.1 to 20 μm. Moreover, it is preferable that a film made of at least one metal selected from magnesium, titanium, zirconium and hafnium is formed, before the joining, on at least one of a surface of said first member made of aluminum nitride which is to be joined to said second member and a surface of said brazing material which is to be joined to the aluminum nitride member by sputtering, vapor deposition, friction press contacting, plating or the like. This film enhances the reaction between the brazing material. The thickness of this film is preferably is 0.1 to 5 μm.

The present inventors produced various joined articles according to the above-mentioned joining process, examined the structure of the joining portion or the joining layer in detail, and observed corrosion resistance against the halogen-based corrosive gas. This will be successively explained.

BRIEF DESCRIPTION OF THE DRAWINGS

FIGS. 1(a), 1(b) and 1(c) are front views illustrating an aluminum nitride member 8 and an opponent member 7 before joining;

FIGS. 2(a) and 2(b) are enlarged sectional views illustrating joining layers formed according to the present invention. In FIG. 2(a) a joining layer 23A, having a continuous phase 24 and an active metal layer 25, is formed between an aluminum nitride member 8 and an opponent member 7. In FIG. 2(b) a joining layer 23B, further including dispersed phases 27, is formed between an aluminum nitride member 8 and an opponent member 7;

FIGS. 3(a) and 3(b) are enlarged sectional views illustrating joining layers formed according to the present invention. In FIG. 3(a) a joining layer 23C, including a continuous phase 26 and dispersed phases 27, is formed between aluminum nitride member 8 and an opponent member 7, while in FIG. 3(b), a joining layer 23D, further including a reaction phase 29, is formed between aluminum nitride member 8 and opposed member 7;

FIGS. 4(a) and 4(b) are enlarged sectional views illustrating joining layers formed according to the present invention. In FIG. 4(a) joining layer 23E formed between aluminum nitride member 8 and opponent member 7 includes a continuous phase 26, and dispersed phases 27 and 30. In FIG. 4(b) a joining layer 23F is similar to 23E of FIG. 4(a). However, joining layer 23F additionally includes a reaction layer 29;

FIGS. 5(a) and 5(b) show the effect of contact of halogen-based corrosive gas which is brought into contact with joining layers according to the present invention;

FIGS. 7(a), 7(b), 7(c) and 7(d) show steps of forming and testing embodiments of the present invention. FIG. 7(a) shows provision of a brazing sheet 9A between two aluminum nitride members 7A and 8A. FIG. 7(b) illustrates dimensioning of the bonded article from FIG. 7(a). FIG. 7(c) depicts a four-point bending test of the article shown in FIG. 7(b). FIG. 7(d) is an enlarged sectional view showing a corroded region of the article after a plasma exposure test;

In FIG. 8(a) a metallic member 42 is joined to an aluminum nitride member 41. In FIG. 8(b) a tensile strength test is depicted for the article of FIG. 8(a);

FIG. 12 is a schematic illustration of FIG. 11.

FIGS. 1(a), 1(b) and 1(c) are front views for illustrating aluminum nitride members 8 and opponent members 7 before joining. In an embodiment of FIG. 1(a), a joining surface 8a of the aluminum nitride member is opposed to a joining surface 7a of the opponent member 7, and a sheet-shaped brazing material 9 is held between the joining surfaces. In this state in which the sheet 9 is contacted with both the joining surfaces, brazing is effected by heating.

Figure 6:
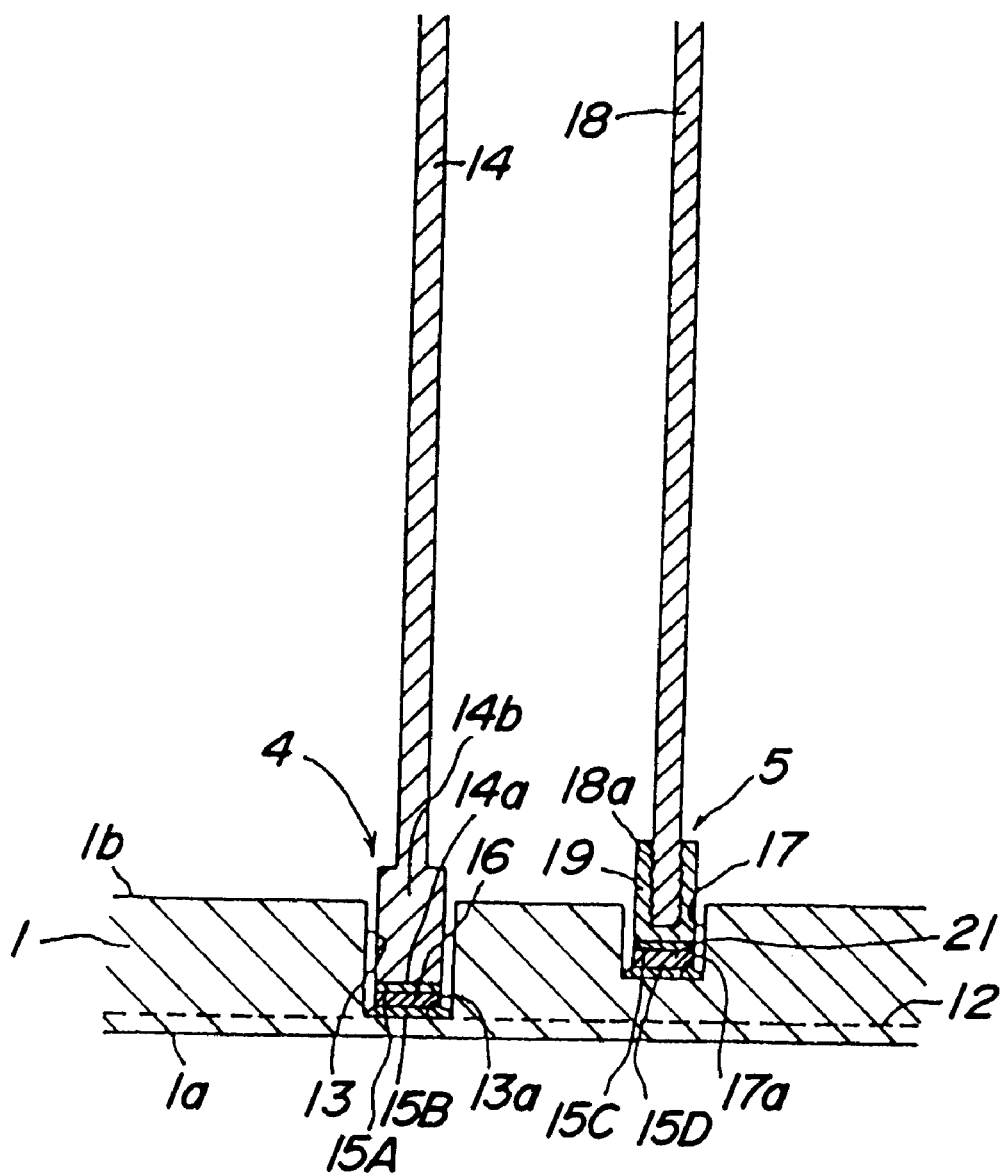
FIG. 6 is cross-sectional view illustrating a structure of an electrostatic chuck device.

In an embodiment of FIG. 1(b), a metallic film 10 is formed at a joining surface 8a of the aluminum nitride member 8. While a joining surface 7a of the opponent member and the metallic film 10 are brought to into contact with the sheet 9, brazing is effected by heating. In an embodiment of FIG. 1(c), a metallic film 22 is formed on a surface of a brazing material sheet on a side of an aluminum nitride member a. While the joining surface 7a is contacted with the sheet 9 and the metallic film 22 is contacted with the joining surface 8a, brazing is effected by heating. As mentioned above, the material of each of the metallic films 10 and 22 is at least one kind of a metal selected from the group consisting of copper, aluminum, nickel, magnesium, titanium, zirconium and hafnium.

FIGS. 2(a) and 2(b), FIGS. 3(a) and 3(b), and FIGS. 4(a) and 4(b) are schematic, enlarged, sectional views for illustrating joining layers formed according to the present invention, respectively. In FIG. 2(a), a joining layer 23A is formed between an aluminum nitride member 8 and an opponent member 7. This joining layer 23A includes a continuous phase 24 composed of a metal selected from the group consisting of copper, aluminum and nickel as a main component. The opponent member 7 is composed of a ceramic material or a metal of copper or aluminum excluding nickel.

An active metal layer 25 is formed on the joining layer 23A on a side of the aluminum nitride member 8, and this active metal layer is made of at least one kind of an active metal selected from the group consisting of titanium, zirconium and hafnium. It is considered that since these active metals are difficult to solid solve in the above main component, and easily wet the surface of the aluminum nitride member, it is considered that such an active metal forms a layer as shown.

The construction of the continuous phase 24 and the active metal layer 25 in the joining layer 23B shown in FIG. 2(b) is the same as that in the joining layer 23A of FIG. 2(a). However, in FIG. 2(b), a number of dispersing phases 27 are formed in the continuous phase 24. These dispersing phases 27 are constituted by particles made of the third component contained in the brazing material.

In a joining layer 23C shown in FIG. 3(a), a number of dispersing phases 27 are formed in a continuous phase 26. The dispersing phases 27 are constituted by particles made of the third component in the brazing material. The continuous phase 26 is joined to a surface of the opponent member 7, and also firmly joined to a surface 8a of the aluminum nitride member 8.

The present inventors discovered that when the main component and the second component of the brazing material are aluminum and magnesium, respectively, a continuous phase is produced through magnesium being solid-solved in this continuous phase. In this case, different from the microstructures shown In FIGS. 2(a) and 2(b), no active metal layer is formed along the surface of the aluminum nitride member 8. As a result, the main component of the continuous phase 26 shown in FIG. 3(b) is aluminum and magnesium is solid-solved in the continuous phase 26.

In the joining layer 23D shown in FIG. 3(b), the main component and the second component (active component) of the brazing material are aluminum and magnesium, respectively. On the other hand, a nickel member 28 was used as an opponent member. By so doing, a reaction phase 29 composed of the nickel-aluminum intermetallic compound was formed along the surface 28a of the nickel member 28 through the reaction between the nickel member 28 and aluminum in the brazing material during the joining.

In a joining layer 23E in FIG. 4(a), a number of dispersion phases 27 composed of particles of a third component and a number of dispersion phases 30 composed of the nickel-aluminum intermetallic compound are dispersed together in a continuous phase 26. In order to produce such a microstructure, a main component and an active component of the brazing material are aluminum and magnesium, respectively, and the third component is incorporated into the brazing material. As shown in FIG. 1(b), a nickel film 10 is preliminarily formed on a surface 8a of the aluminum nitride member 8 or alternatively as shown in FIG. 1(c), a nickel film 22 is preliminarily formed on a surface of the sheet-shaped brazing material 9 on the side of the aluminum nitride member 8.

When brazing is then effected, a continuous phase 26 in which magnesium is solid-solved in aluminum is produced, and the nickel-aluminun intermetallic compound is produced through the reaction between the component of the thin nickel film and aluminum which produces the dispersed phases 30 in the continuous phase 26 through dispersion of the intermetallic compound.

When a brazing material and producing process similar to those mentioned above are employed and a nickel member 28 is used as an opponent member, a joining layer 23F having a microstructure shown in FIG. 4(b) is produced. A continuous phase 26 and dispersion phases 27 and 30 in the joining layer 23F are the same as those in the joining layer 23E shown in FIG. 4(a), respectively. Further, a reaction layer 29 composed of the nickel-aluminum intermetallic compound is produced along the surface 28a of the nickel member 28.

Among the above-exemplified joining layers having the respective microstructures, it is preferable that the main component of the continuous phase is aluminum and magnesium is solid-solved in this continuous phase. The embodiments shown in FIGS. 3(a), 3(b), 4(a) and 4(b) correspond to this. Because, when titanium, zirconium or hafnium is used as an active metal, as shown in FIG. 2(a) and 2(b), the active metal tends to collect and form the active metal layer 25 on the surface of the aluminum nitride member, so that the wettability of the aluminum nitride with the brazing material is enhanced.

For example, when the halogen-based corrosive gas is brought into contact with the joined article along arrows A as shown in FIG. 5(a), the joining layer is successively corroded from the surface side, whereby surfaces of the metallic particles in the continuous phase 24 are corroded. A reference numeral 37 denotes a corroded area 37, "L" being the width of the corroded area 37 as viewed from the front side of the joining layer. At that time, since the third component such as Si is more likely to be corroded as compared with the metals as the main component of the dispersing phase, pores 36 are formed at the dispersing phases of the third component. Those pores 36 are formed in an area far deeper than the corroded area 37.

Regarding this, the present inventors have discovered that the active metal layer 25 was also more likely to be corroded with the halogen-based corrosive gas, and that a corroded area 38 occurred in a layer-shaped form along the above layer 25 between the continuous phase 24 and the aluminum nitride member 8. The width of the corroded layer 38 was far greater than that L of the corroded area 37 in the continuous phase 24. However, such slender layer-shaped corroded area 38 may also conspicuously reduce the joining strength between the members 7 and 8.

To the contrary, when the main component of the continuous phase is aluminum and magnesium is solid-solved in the continuous phase, such a layer-shaped corroded area 38 does not occur so that the corrosion resistance against the halogen-based corrosive gas may be further enhanced.

The present inventors further discovered that the nickel-aluminum intermetallic compound has a conspicuous corrosion resistance against the halogen-based corrosive gas. For example, when the halogen-based corrosive gas is brought into contact with the joining layer having the microstructure shown in FIGS. 4(a) or 4(b) along the arrows A in FIG. 5(b), the continuous phase 26 is corroded, and pores 36 are formed through the dispersion phases made of the third component being simultaneously corroded. However, no corrosion is seen in the reaction layer 29 composed of the nickel-aluminum intermetallic compound. Further, no corrosion is seen in the dispersion phases 30 composed of the nickel-aluminum intermetallic compound, including the dispersion phases 30 in the corroded area 37, either.

As mentioned above, the nickel-aluminum intermetallic compound exhibited high corrosion resistance, whether it was present in the form of the dispersion phase or contained in the continuous phase. Particularly, when a number of the dispersion phases exist in the continuous phase composed mainly of aluminum, propagation of the corrosion progressing in the continuous phase is stopped with the dispersion phases 30 dispersed in the continuous phase. Therefore, such is particularly advantageous, because the corrosion resistance of the continuous phase itself is enhanced.

The nickel-aluminum intermetallic compound includes $Al_3Ni$, $Al_3Ni_2$, $AlNi$ and $AlNi_3$. The particle diameter of the dispersion phase composed of the nickel-aluminum intermetallic compound is ordinarily 2 to 500 $\mu$m, and particularly preferably 10 to 100 $\mu$m. The dispersion phases have unspecified shapes.

As the halogen-based corrosive gasp $CF_4$, $NF_3$, $ClF_3$, HF, HCl and HBr may be recited by way of example. Among $CF_4$, $NF_3$ and $ClF_3$, $ClF_3$ has a particularly high F radial-dissociating degree and the highest corrosion resistance when compared at the same temperature and plasma output. The thickness of the joining layer is preferably not less than 1 $\mu$m, and preferably not more than 500 $\mu$m.

The aluminum nitride member constituting the joined article according to the present invention is a member to be exposed mainly to the halogen-based corrosive gas, and is to be favorably installed in a semiconductor-producing apparatus using the halogen-based corrosive gas as a film-forming gas or an etching gas.

As such aluminum nitride members, mention may be made, for example, of positive type devices such as ceramic heaters in which a resistive heating element is buried in an aluminum nitride substrate, electrostatic ceramic chucks in which an electrostatically chucking electrode is buried in an aluminum nitride substrate, electrostatic chuck-provided heaters in which a resistive heating element and an electrostatically chucking electrode are buried in an aluminum nitride substrate, and a high frequency wave-generating electrode device in which a plasma generating electrode is buried in a aluminum nitride substrate.

In addition, mention may be made, for example, of devices such as dummy wafers, shadow rings, tubes for generating a high frequency plasma, a doom for generating a high frequency plasma, a high frequency wave-permeating windows, infrared beam-permeating windows, lift pins for supporting semiconductor wafers, showers, etc.

In the following, various embodiments to which the present invention is applied will be explained. FIG. 6 is a view illustrating an example of a structure of the electrostatic chuck device. In FIG. 6, a reference numeral 1 denotes an electrostatically chucking main body, and reference numerals 4 and 5 denotes an electrode-joining portion and a thermocouple-joining portion, respectively. The detailed structures of the electrode-joining section 4 and the thermocouple-joining portion 5 are shown in FIG. 6.

As shown in FIG. 6, a mesh 12 is buried in the electrostatically chucking main body 1 near its surface 1a. This mesh may be employed as a resistive heating element of the aluminum nitride heater.

Further, in the electrostatically chucking main body 1 is formed a hole 13, which is opened to a rear surface 1b of the main body 1. A part of the mesh 12 is exposed from a bottom surface 13a of the hole 13. A terminal 14 is made of a corrosion resistant metal such as nickel, and has a cylindrical tip portion 14a having a diameter greater than the remaining portion of the terminal 14. A sheet 15A made of the brazing material in the present invention, a residual stress-mitigating insert material 16 and another sheet 15B made of the brazing material in the present invention are inserted between the tip end face 14a of the tip portion 14b and the bottom surface 13a of the hole 13. The electrode-joining section is formed by brazing. FIG. 6 shows the electrostatic chuck in a non-joined state.

In the electrostatically chucking main body 1 is also formed a hole 17, which is opened to a rear surface 1b of the main body and has a bottom surface 17a formed by exposed aluminum nitride. The hole 17 is shallower than the hole 13. A pair of electrodes 18 constituting a thermocouple are received in a cap made of nickel for the production of the thermocouple is provided around the tip portion 18a of the thermocouple 18. The outer diameter of the cap 19 is slightly smaller than the inner diameter of the hole 17, which enables the cap 19 to be easily inserted into the hole 17 at a given interval therebetween.

Between the tip end face of the cap 19 and the bottom portion 17a of the hole 17 are inserted a sheet 15C made of a brazing material in a present invention, an insert material 21 and another sheet 15D of the brazing material in the present invention. A thermocouple-joining section 5 is formed by brazing.

In the electrostatic chuck shown in FIG. 6, the present invention is applied to the following.

(a) Joining between the terminal 14 and the aluminum nitride member 1

(b) Joining between the cap 19 and the aluminum nitride member 1

In the electrode-joining section 4 in the electrostatic chuck shown in FIG. 6, according to the present invention, the brazing material joins the terminal 14 to the electrostatically chucking main body 1 made of aluminum nitride as well as to the metallic mesh 12 buried in the main body 1.

In the following, more concrete examples will be explained.

EXPERIMENT 1

Joined articles each composed of an aluminum nitride member and another aluminum nitride member were produced, and strength and corrosion-resistance of their aluminum nitride joined articles were examined. First, two aluminum nitride members and were prepared, and then, as shown in FIG. 7(a), a sheet 9A made of a brazing material having a composition given in Table 1 was sandwiched between the two aluminum nitride members 7A and 8A, which was heated at given temperature shown in Table 1 in vacuum, thereby obtaining a joined article.

As a result, joined aluminum nitride articles in Example Nos. 1–28 using brazing materials falling in the scope of the present invention and those in Comparative Example Nos.

1–13 using brazing materials falling outside the scope of the present invention were obtained. In Example Nos. 25 and 26, a titanium film was formed on a surface of each of the aluminum nitride member in thickness of 3 μm or 1 μm, respectively, by sputtering, before the joining. In Example No. 27, a titanium film was formed on a surface of the brazing material in thickness of 1 μm by sputtering, before the joining. In Example No. 28, an aluminum film was formed on a surface of each of the aluminum nitride member in thickness of 1 μm by sputtering, before the joining.

Plural four-point bending test pieces having a dimension of 3 mm×4 mm×40 mm as shaped as shown in FIG. 7(b) were prepared from each of the joined aluminum nitride articles in Examples and Comparative Examples. Among them, four-point bending strength of the test piece of each of Examples and Comparative Examples was determined as shown in FIG. 7(c) according to JIS (Japanese Industrial Standard) R 1601.

Thereafter, the remaining test pieces were each subjected to a plasma exposure test at an atmosphere temperature of 400° C. and a plasma output of 1 kW in a $CF_4$ gas for 160 hours. After the plasma exposure test, tensile strength was measured, and a section of a joined portion was observed through a microscope as shown in FIG. 7(d). At that time, the length of a color-changed area 37 in the joining layer 32 was measured as a corroded distance "L". Thus obtained results are shown in Table 1.

As seen from the results in Table 1, Example Nos. 1 to 28 suffered no great change in their four-point bending strength between before and after the plasma exposure test, possessed sufficient four-point bending strength even after the plasma exposure test, and exhibited shorter corroded distances and satisfactory corrosion resistance, as compared with Comparative Example Nos. 1 to 13. Among these Examples, the copper-based brazing materials in Example Nos. 1 to 7 and the nickel-based brazing material in Example Nos. 8 to 14 turned to be preferable, because they exhibited particularly satisfactory corrosion resistance. Further, the joined articles in Examples using the aluminum-based brazing materials, Example Nos. 25 to 28 in which a given film was provided at a joining interface turned out to exhibit greater bending strength as compared with Example No. 19 in which no such a film was provided.

TABLE 1

| Test No. | Brazing material | Joining temperature °C. | 4-point bending strength MPa before test | 4-point bending strength MPa after test | Corroded distance μm |
|---|---|---|---|---|---|
| Example A1 | Cu-0.3Ti-3Si-2Al | 1050 | 190 | 185 | 130 |
| Example A2 | Cu-1.0Ti-3Si-2Al | 1050 | 220 | 218 | 30 |
| Example A3 | Cu-2.25Ti-3Si-2Al | 1050 | 242 | 232 | 15 |
| Example A4 | Cu-5.05Ti-3Si-2Al | 1050 | 250 | 242 | 25 |
| Example A5 | Cu-10Ti-3Si-2Al | 1050 | 255 | 220 | 100 |
| Example A6 | Cu-2.25Ti-8Si-4Al | 1050 | 245 | 233 | 30 |
| Example A7 | Cu-2.25Ti-10Si-10Al | 1050 | 212 | 200 | 120 |
| Example A8 | Cu-2.5Zr-3Si-2Al | 1050 | 230 | 244 | 25 |
| Example A9 | Cu-2.25Hf-3Si-2Al | 1050 | 211 | 202 | 30 |
| Example A10 | Cu-1.5Mg-3Si-2Al | 1050 | 195 | 180 | 50 |
| Example A11 | Ni-0.3Ti-3.5Si-1.8B | 1085 | 185 | 160 | 120 |
| Example A12 | Ni-2.25Ti-3.5Si-1.8B | 1085 | 204 | 195 | 20 |
| Example A13 | Ni-10Ti-3.5Si-1.8B | 1085 | 246 | 200 | 80 |
| Example A14 | Ni-2.25Ti-16Si-4B | 1085 | 185 | 150 | 100 |
| Example A15 | Ni-2.25Zr-3.5Si-1.8B | 1085 | 198 | 191 | 30 |
| Example A16 | Ni-2.25Hf-3.5Si-1.8B | 1085 | 205 | 210 | 35 |
| Example A17 | Ni-1.5Mg-3.5Si-1.8B | 1085 | 188 | 185 | 30 |
| Example A18 | Al-0.3Mg-10Si | 610 | 95 | 88 | 150 |
| Example A19 | Al-1.5Mg-10Si | 610 | 110 | 65 | 100 |
| Example A20 | Al-10Mg-10Si | 610 | 112 | 50 | 140 |
| Example A21 | Al-1.5Mg-20Si | 610 | 105 | 52 | 150 |
| Example A22 | Al-2.5Ti-10Si | 610 | 125 | 70 | 100 |
| Example A23 | Al-2.5Zr-10Si | 610 | 118 | 72 | 110 |
| Example A24 | Al-2.5Hf-10Si | 610 | 124 | 68 | 100 |
| Example A25 | Al-1.5Mg-20Si | 610 | 177 | 175 | 120 |
| Example A26 | Al-1.5Mg-10Si | 610 | 188 | 151 | 150 |
| Example A27 | Al-1.5Mg-10Si | 610 | 252 | 242 | 100 |
| Example A28 | Al-1.5Mg-10Si | 610 | 314 | 303 | 90 |
| Comparative Example A1 | Cu-0.1Ti-3Si-2Al | 1050 | not joined | | |
| Comparative Example A2 | Cu-12Ti-3Si-2Al | 1050 | 222 | 48 | 800 |
| Comparative Example A3 | Cu-2.25Si-15Si-10Al | 1050 | 200 | 52 | 750 |
| Comparative Example A4 | Ni-0.1Ti-3.5Si-1.8B | 1085 | not joined | | |
| Comparative Example A5 | Ni-12Ti-3.5Si-1.8B | 1085 | 196 | 32 | 700 |
| Comparative Example A6 | Ni-2.25Ti-20Si-8B | 1085 | 188 | 22 | 700 |
| Comparative Example A7 | Al-0.1Mg-10Si | 610 | not joined | | |
| Comparative Example A8 | Al-12Mg-10Si | 610 | 95 | 31 | 700 |
| Comparative Example A9 | Al-1.5Mg-25Si | 610 | 105 | 22 | 750 |
| Comparative Example A10 | 99.9Al | 680 | not joined | | |
| Comparative Example A11 | Al-12Si-3Cu | 600 | not joined | | |
| Comparative Example A12 | Ag—Cu—In—Ti | 750 | 250 | 20 | 1100 |
| Comparative Example A13 | Ag-35Cu-2.5Ti | 850 | 270 | 30 | 1200 |

EXPERIMENT 2

Figure 8A:
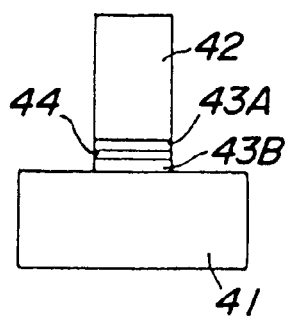
FIGS. 8(a), 8(b) and 8(c) depict formation and testing of an aluminum nitride joined article.

Joined articles each composed of an aluminum nitride member and one selected from various metallic members were produced, and strength and corrosion-resistance of their aluminum nitride joined articles were examined. First, aluminum nitride members and metallic members shown in the following Table 2 were prepared. Then, as shown in FIG. 8(a), a sheet 43A made of a brazing material having a composition given in Table 2, an insert member 44 and another sheet 43B made of the brazing material were sandwiched between the aluminum nitride member 41 and the metallic member 42, which was heated at given temperature shown in Table 2. The insert member 44 was provided to mitigate residual stress. By the above heating, a joining layer 50 was formed.

As a result, plural joined bodies each in Example Nos. 1–31 using brazing materials falling in the scope of the present invention and plural ones each in Comparative Example Nos. 1–8 using brazing materials falling outside the scope of the present invention were obtained. In Example Nos. 27 and 28, a titanium film was formed on a surface of the aluminum nitride member in thickness of 3 μm or 1 μm, respectively, by sputtering, before the joining. In Example No. 29, a titanium film was formed on a surface of the brazing material in thickness of 1 μm by sputtering, before the joining. In Example No. 30, an aluminum film was formed on a surface of the aluminum nitride member in thickness of 1 μm by sputtering, before the joining. With respect to Example Nos. 1 to 30 and Comparative Example Nos. 1 to 8, a load of 0.6 g/mm² was applied, whereas a load of 26.5 g/mm² was applied to Example No. 31 only.

Figure 8B:
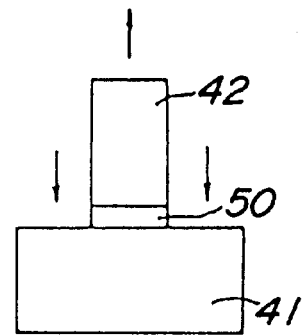

As shown in FIG. 8(b), some of thus obtained test pieces in Examples and comparative Examples were subjected to the four-point bending strength test, and tensile strength was determined. The remaining test pieces were subjected to the same plasma exposure test as in Experiment 1. After the plasma exposure test, tensile strength was measured, and the corroded distance was determined in the same way as in Experiment 1. The thus obtained results are shown in Table 2.

As seen from the results in Table 1, Example Nos. 1 to 31 suffered no great change in their four-point bending strength between before and after the plasma exposure test, possessed sufficient four-point bending strength even after the plasma exposure test, and exhibited shorter corroded distances and satisfactory corrosion resistance as compared with Comparative Example Nos. 1 to 13. Among these Examples using the aluminum-based brazing materials, Example Nos. 27 to 30 in which a given film was provided at a joining interface turned out to exhibit greater bending strength as compared with Example No. 2 in which no such a film was provided. Further, the joined body in Example 31 in which a greater load was applied during the joining turned out to give greater tensile strength as compared with Example No. 2 in which a smaller load was applied during the joining.

TABLE 2

| | Metal | Brazing material | Insert material | Thickness μm | Tensile strength (MPa) before test | Tensile strength (MPa) after test | Corroded distance |
|---|---|---|---|---|---|---|---|
| Example B1 | Ni | Al-0.3Mg-10Si | Al | 0.55 | 5.3 | 5.0 | 120 |
| Example B2 | | Al-1.5Mg-10Si | Al | 0.55 | 5.1 | 5.0 | 100 |
| Example B3 | | Al-10Mg-10Si | Al | 0.55 | 4.8 | 4.6 | 115 |
| Example B4 | | Al-1.5Mg-20Si | Al | 0.55 | 4.8 | 4.5 | 150 |
| Example B5 | | Al-1.5Mg-10Si | Cu | 0.5 | 5.5 | 5.3 | 110 |
| Example B6 | | Al-2.5Ti-10Si | Al | 0.55 | 6.7 | 8.3 | 100 |
| Example B7 | | Al-2.5Zr-10Si | Al | 0.55 | 6.5 | 6.0 | 100 |
| Example B8 | | Al-2.5Hf-10Si | Al | 0.55 | 6.7 | 6.2 | 95 |
| Example B9 | Ni | Cu-0.3Ti-3Si-2Al | Cu | 0.5 | 10.2 | 9.4 | 55 |
| Example B10 | | Cu-2.25Ti-3Si-2Al | Cu | 0.5 | 13.2 | 12.5 | 25 |
| Example B11 | | Cu-10Ti-3Si-2Al | Cu | 0.5 | 12.2 | 9.4 | 85 |
| Example B12 | | Cu-2.25Ti-10Si-10Al | Cu | 0.5 | 12.5 | 9.6 | 80 |
| Example 1B3 | | Cu-2.25Ti-3Si-2Al | Cu | 2 | 14.0 | 13.0 | 20 |
| Example B14 | | Cu-2.25Zr-3Si-2Al | Cu | 0.5 | 12.5 | 12.0 | 22 |
| Example B15 | | Cu-2.25Hf-3Si-2Al | Cu | 0.5 | 11.0 | 10.6 | 20 |
| Example B16 | | Cu-1.5Mg-3Si-2Al | Cu | 0.5 | 11.5 | 10.5 | 30 |
| Example B17 | Ni | Ni-0.3Ti-3.5Si-1.8B | Cu | 0.5 | 10.3 | 8.5 | 60 |
| Example 1B8 | | Ni-2.25Ti-3.5Si-1.8B | Cu | 0.5 | 12.3 | 11.3 | 20 |
| Example B19 | | Ni-10Ti-3.5Si-1.8B | Cu | 0.5 | 10.5 | 8.6 | 65 |
| Example B20 | | Ni-2.25Zr-16Si-4B | Cu | 0.5 | 10.4 | 8.7 | 90 |
| Example B21 | | Ni-2.25Hf-3.5Si-1.8B | Cu | 0.5 | 12.5 | 11.5 | 30 |
| Example B22 | | Ni-1.5Mg-3.5Si-1.8B | Cu | 0.5 | 12.8 | 11.5 | 30 |
| Example B23 | Cu | Al-1.5Mg-10Si | Al | 0.55 | 6.0 | 5.5 | 100 |
| Example B24 | | Cu-2.25Ti-3Si-2Al | Cu | 0.5 | 11.5 | 10.5 | 20 |
| Example B25 | | Ni-2.25Ti-3.5Si-1.8B | Cu | 0.5 | 12.5 | 11.5 | 30 |
| Example B26 | Al | Al-1.5Mg-10Si | Al | 0.55 | 5.4 | 5.2 | 110 |
| Example B27 | Ni | Al-1.5Mg-10Si | Al | 0.55 | 10.8 | 8.0 | 120 |
| Example B28 | | Al-1.5Mg-10Si | Al | 0.55 | 12.6 | 9.8 | 115 |
| Example B29 | | Al-1.5Mg-10Si | Al | 0.55 | 15.7 | 12.7 | 150 |
| Example B30 | | Al-1.5Mg-10Si | Al | 0.55 | 17.4 | 13.3 | 100 |
| Example B31 | | Al-1.5Mg-10Si | Al | 0.55 | 40.2 | 37.5 | 100 |
| Comparative Example B1 | Ni | Cu-0.1Ti-3Si-2Al | Cu | 0.5 | 9.5 | 3.3 | 800 |
| Comparative Example B2 | | Cu-2.25Ti-15Si-10Al | Cu | 0.5 | 9.5 | 2.2 | 850 |
| Comparative Example B3 | Ni | Al-12Mg-10Si | Al | 0.55 | 4.1 | 2.2 | 900 |
| Comparative Example B4 | | Al-0.1Mg-10Si | Al | 0.55 | 4.5 | 2.5 | 900 |
| Comparative Example B5 | | Al-1.5Mg-25Si | Al | 0.55 | 4.2 | 2.0 | 1000 |
| Comparative | Ni | Ni-12Ti-3.5Si-1.8B | Cu | 0.5 | 9.4 | 3.0 | 1000 |

TABLE 2-continued

|  | Metal Brazing material | Insert material | Thickness μm | Tensile strength (MPa) before test | Tensile strength (MPa) after test | Corroded distance |
|---|---|---|---|---|---|---|
| Example B6 Comparative Example B7 | Ni-0.1Ti-3.5Si-1.8B | Cu | 0.5 | 8.5 | 2.5 | 900 |
| Comparative Example B8 | Ni-2.25Ti-20Si-3B | Cu | 0.5 | 7.8 | 2.7 | 900 |

EXPERIMENT 3

Figure 8C:
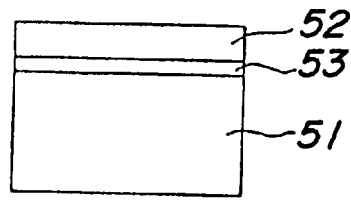

Joined articles each composed of an aluminum nitride member and a nickel member were produced, and their corrosion-resistance was examined. First, an aluminum nitride member 51 having a dimension of 10 mm×10 mm×10 mm and a nickel member 52 having a dimension of 10 mm×10 mm×0.5 mm were prepared. Then, as shown in FIG. 8(c), a sheet 53 made of a brazing material having a composition given in Table 3 with a dimension of 10 mm×10 mm×0.1 mm was inserted between the aluminum nitride member 51 and the nickel member 52, which was heated at given temperature shown in Table 3 in vacuum. Before joining, the nickel member has been softened by annealing at 1000° C. in vacuum for 1 hour, thereby reducing residual stress after the joining.

Each of the thus obtained test pieces was subjected to the four-point bending strength measurement before and after the plasma exposure test in the same manner as in Experiment 2. In the plasma exposure test, $ClF_3$ which has a high fluorine-dissociation degree and stronger corrosive force at the same temperature and plasma output than $CF_4$ was used, and the plasma output was 1 kW, the temperature was 450° C. and the exposure time was 200 hours. The corroded distance M of the layer-shaped corrosion area along the interface between the joining layer and the aluminum nitride member was measured. Thus obtained results are shown in Table 3.

Example Nos. C1–C7 used the aluminum alloy-based brazing materials, Example Nos. C8–C11 used the copper alloy-based brazing materials, and Example Nos. C12–C15 used the nickel-based brazing materials, and their results are shown in Table 3. Comparison of those results revealed that the aluminum alloy-based brazing materials added with magnesium exhibited the most favorable corrosion resistance. The reason is considered that magnesium among the active metals exhibits better corrosion resistance against the halogen gas as compared with titanium, zirconium and hafnium, and that magnesium is solid-solved in the aluminum alloy, whereas each of titanium, hafnium and zirconium is segregated at the joining interface so that the corroding speed is high.

Further, Example No. C7 in which the brazing material was plated with nickel before the joining exhibited extremely good corrosion resistance. The reason is considered that plating the surface of the brazing material with nickel improves wettability and reduces very small non-joined portions at the joining interface, and the nickel-aluminum intermetallic compound phases having good corrosion resistance are dispersed in the brazing material layer after the joining.

Figure 9:
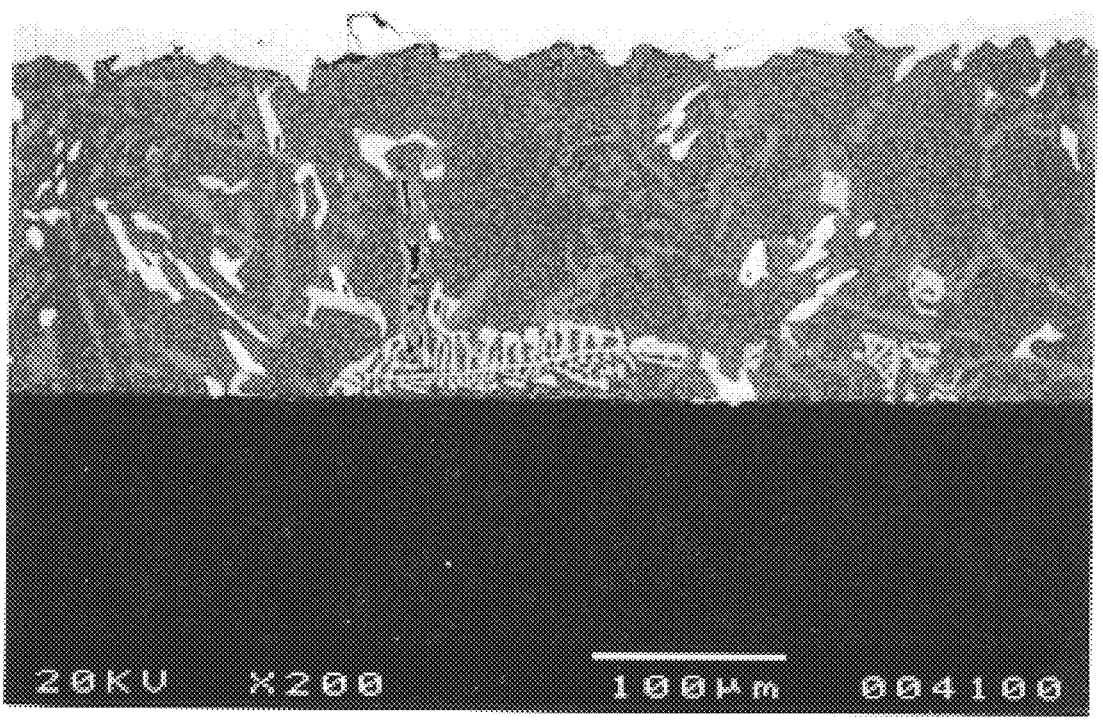
FIG. 9 is an electron microscope photograph illustrating a ceramic microtexture of a portion of a test sample of Example No. C7 of Table 3, before execution of a plasma exposure test.
Figure 10:
FIG. 10 is a schematic illustration of FIG. 9.

FIG. 9 is an electron microscope photograph showing a ceramic texture of a part of a test sample in Example No. C7 given in Table 3 before the plasma exposure test, and FIG. 10 is a view for schematically explaining FIG. 9. It is seen that an aluminum layer 26 (a gray portion in the photograph) in which magnesium is solid-solved exists in the joining layer between the aluminum nitride member 8 and the nickel member 28, and that a number of the dispersion phases 30 (white portions in the photograph) composed of the nickel-aluminum intermetallic compound are formed in the aluminum layer 26. Further, a number of slender dispersion phases 27 (portions slightly brighter than the aluminum layer 26 in the photograph) composed mainly of a third component are formed. In addition, the formation of the reaction phase 29 is also observed.

Figure 11:
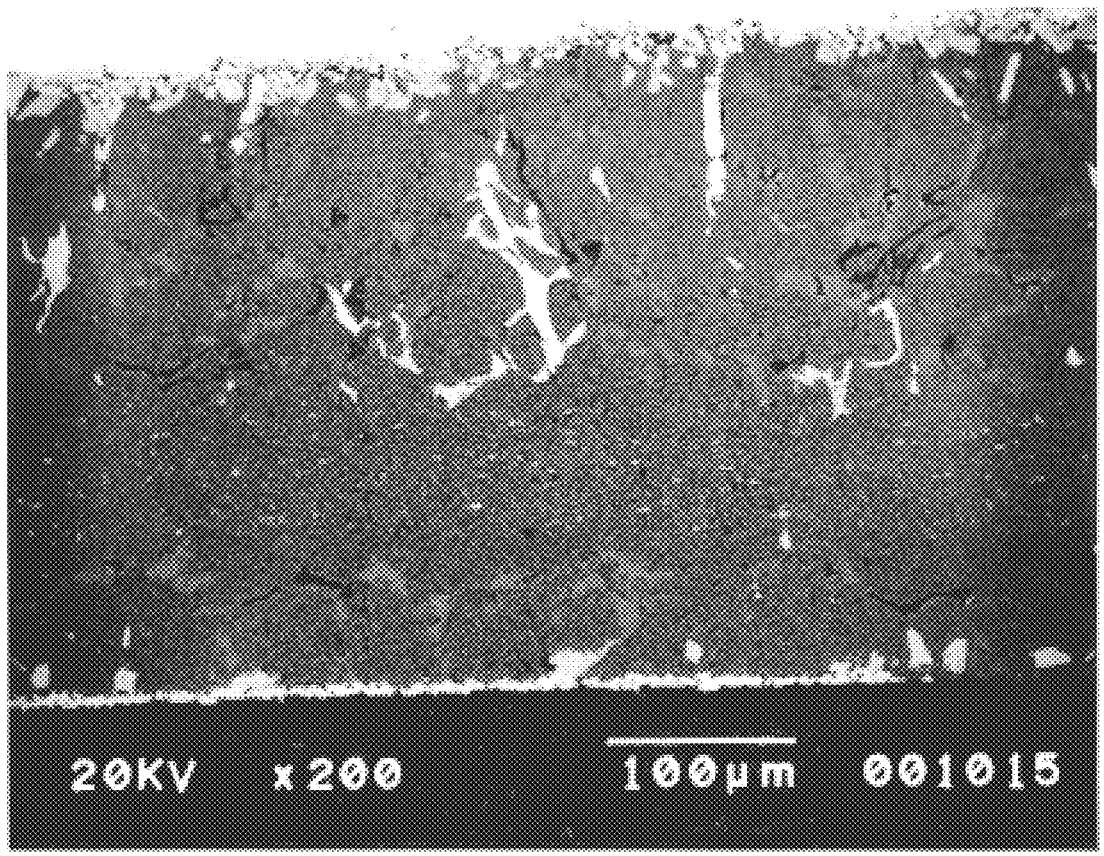
FIG. 11 is an electron microscope photograph of the portion of the test sample illustrated in FIG. 9, after execution of the plasma exposure test.

FIG. 11 is an electron microscope photograph showing a ceramic texture of a part of a test sample in Example No. C7 given in Table 3 after the plasma exposure test, and FIG. 12 is a view for schematically explaining FIG. 11. In FIGS. 11 and 12, the same microstructure as shown in FIGS. 9 and 10 is recognized, but pores are seen along the dispersion phases 27. The pores 36 appear as slender black portions along the thin gray dispersion phases 27 in the photograph.

The present invention is not limited to the above-mentioned experiments only, but various modifications, variations and changes thereof are possible. For example, although only the aluminum nitride members have been recited in the above experiments as examples of the ceramic members to be joined to the aluminum nitride members, similar results were obtained with respect to other ceramic members (for example, dense alumina).

As having bean described above, according to the present invention, the wettability of the alumina nitride member can be enhanced, the joining strength can be increased, and the corrosion resistance of the joined article against the halogen-based corrosive gas can be improved in the case of the production of the joined article of the aluminum nitride and the metallic member or the ceramic member.

TABLE 3

|  | Brazing material | Joining temperature ° C. | Corroded distance μm |
|---|---|---|---|
| Example C1 | Al-0.9Mg-10Si | 610 | 1.8 |
| Example C2 | Al-1.5Mg-10Si | 610 | 1.5 |
| Example C3 | Al-2.0Mg-10Si | 610 | 1.7 |
| Example C4 | Al-2.5Ti-12Si | 610 | 3.6 |
| Example C5 | Al-2.5Zr-10Si | 610 | 3.4 |
| Example C6 | Al-2.5Hf-10Si | 610 | 3.8 |
| Example C7 | Al-1.5Mg-10Si 2 μm thick Ni plated on Al alloy | 610 | 0.3 |
| Example C8 | Cu-2.25Ti-3Si-2Al | 1050 | 2.5 |

TABLE 3-continued

|  | Brazing material | Joining temperature ° C. | Corroded distance μm |
|---|---|---|---|
| Example C9 | Cu-2.25Zr-3Si-2Al | 1050 | 2.2 |
| Example C10 | Cu-2.25Hf-3Si-2Al | 1050 | 2.5 |
| Example C11 | Cu-1.5Mg-3Si-2Al | 1050 | 3.5 |
| Example C12 | Ni-2.25Ti-3.5Si-1.8B | 1085 | 2.2 |
| Example C13 | Ni-2.25Zr-3.5Si-1.8B | 1085 | 2.5 |
| Example C14 | Ni-2.25Hf-3.5Si-1.8B | 1085 | 2.7 |
| Example C15 | Ni-1.5Mg-3.5Si-1.8B | 1085 | 3.8 |

What is claimed is:

1. A corrosion-resistant joining composition for joining a plurality of members that are to be exposed to a halogen-based corrosive gas, said members being made of at least one ceramic member and at least one nickel member, said composition comprising aluminum, 1 to 12 weight % silicon, and 0.3 to 1.5 weight % magnesium, wherein (1) aluminum constitutes a continuous phase as a main component, (2) a dispersing phase composed of a nickel-aluminum intermetallic compound is dispersed throughout the entire continuous phase, and (3) a reaction layer made of a nickel-aluminum intermetallic compound is formed on a surface of said at least one nickel member upon which said joining composition is placed.

2. A joined article comprising
a first member made of aluminum nitride, and
a second member made of nickel, said first and second members being joined to each other through a joining layer, wherein said joining layer comprises aluminum as a main component, 1 to 12 weight % silicon and 0.3 to 1.5 weight % of magnesium in which aluminum constitutes a continuous phase and a dispersing phase composed of a nickel-aluminum intermetallic compound is dispersed throughout the entire continuous phase, said continuous phase of said joining layer being formed directly on the surface of said aluminum nitride first member or on an interposed active metal layer made of a metal selected from the group consisting of copper, aluminum, nickel, magnesium, titanium, zirconium and hafnium, and wherein a reaction layer made of a nickel-aluminum intermetallic compound is formed on a surface of said nickel member upon which said joining layer is joined.

3. The joined article set forth in claim 2, wherein said joining layer includes said continuous phase and an active metal layer located on a side of said first member made of aluminum nitride, said active metal layer comprising at least one kind of an active metal selected from the group consisting of titanium, zirconia and hafnium.

4. The joined article set forth in claim 2, wherein said continuous phase contains aluminum as a main component, and magnesium is solid-solved in said continuous phase.

* * * * *